United States Patent [19]
Tucker

[11] Patent Number: 5,290,086
[45] Date of Patent: Mar. 1, 1994

[54] WINDOW NET FOR RACING AND OFF-ROAD VEHICLES

[76] Inventor: Curt L. Tucker, 1365 Midland Rd., Saginaw, Mich. 48603

[21] Appl. No.: 972,988

[22] Filed: Nov. 10, 1992

[51] Int. Cl.⁵ .............................................. B60R 21/00
[52] U.S. Cl. ................................... 296/152; 280/749
[58] Field of Search ................ 296/102, 152; 280/749

[56] References Cited

U.S. PATENT DOCUMENTS

| | | | |
|---|---|---|---|
| 2,595,833 | 5/1952 | Flaherty | 296/152 X |
| 3,037,809 | 6/1962 | Praha | 280/749 |
| 3,172,702 | 3/1965 | Rose | 280/749 X |
| 3,692,327 | 9/1972 | Barrick, Sr. et al. | 280/749 |
| 4,311,339 | 1/1982 | Heath | 280/749 X |
| 4,906,020 | 3/1990 | Haberer | 280/749 |
| 4,924,814 | 5/1990 | Beaudet | 280/749 X |

Primary Examiner—Joseph D. Pape
Attorney, Agent, or Firm—Learman & McCulloch

[57] ABSTRACT

The window net (18) for racing and off-road vehicles (10) includes a woven mesh (50) with small apertures that provide good visibility through the mesh. Webbing members (68 and 74) are folded over the front and rear edges of woven mesh (50) and stitched together to retain the woven mesh sandwiched between the folded webbing material. Top and bottom webbing members (56 and 62) are folded over the upper edge and the lower edge of the woven mesh (50) and stitched together to retain the woven mesh sandwiched between the folded webbing material. The top webbing member (56) and the bottom webbing member (62) are also stitched to the front webbing member (68) and the rear webbing member (74) to completely encircle the woven mesh (50). The top and bottom webbing members (56 and 62) form sleeves which receive bars (20 and 22) to attach the window net to a vehicle (10). The woven mesh (50) distributes force, from any object that it catches, to the webbing members (56, 62, 68, and 74) around the entire periphery of the window net (18). Indicia can be applied to the woven mesh (50) by paint, dye or ink.

22 Claims, 3 Drawing Sheets

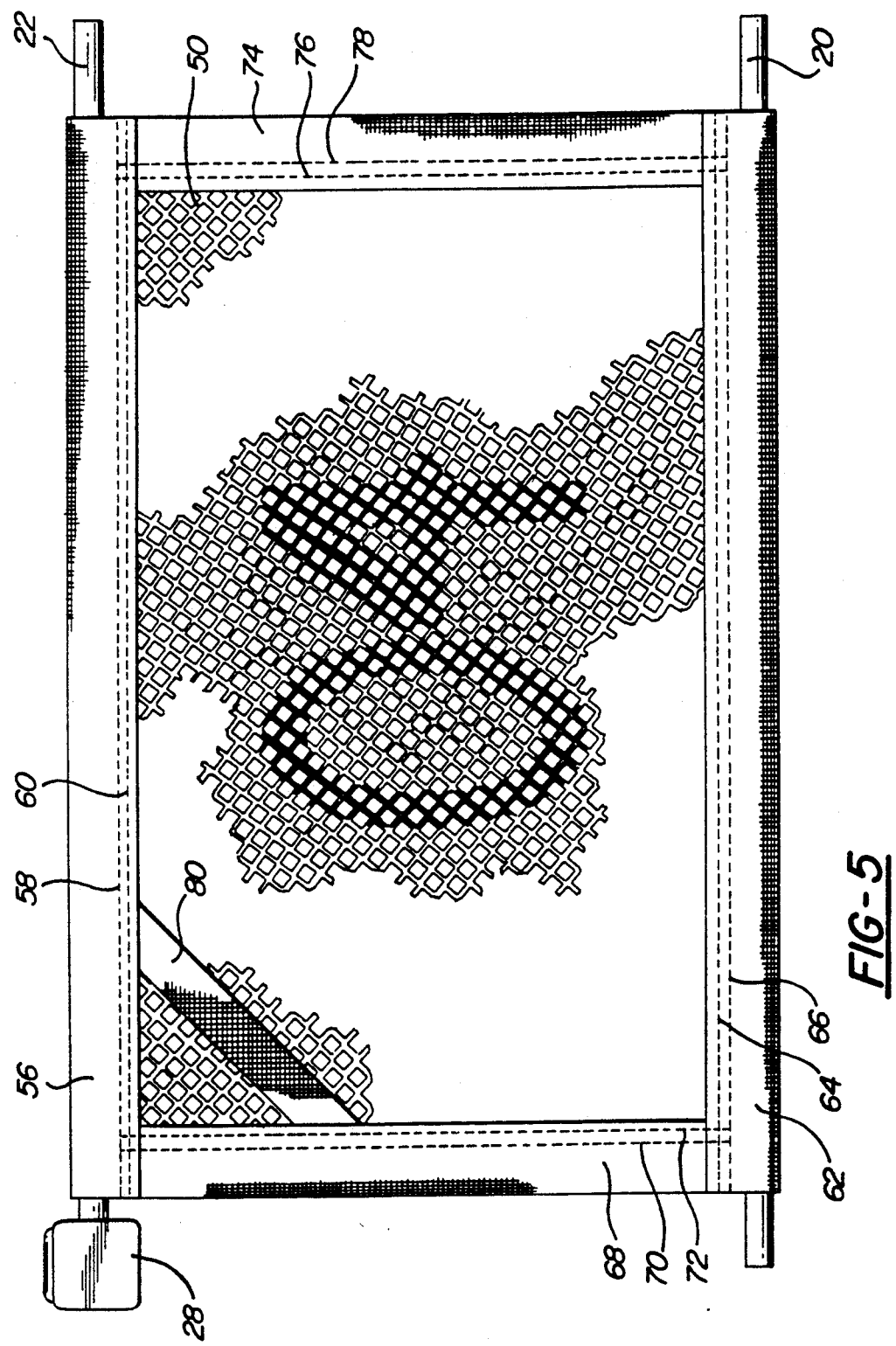

WINDOW NET FOR RACING AND OFF-ROAD VEHICLES

TECHNICAL FIELD

This invention relates to window nets for racing and off-road vehicles and, specifically, to window nets with woven net material for racing and off-road vehicles.

BACKGROUND OF THE INVENTION

Stock car racers and other racing vehicles have bodies without side windows and frequently without doors. The drivers enter these vehicles by climbing through a window opening. A roll bar cage is provided inside the body shell to keep the body shell from collapsing in on a driver in the event of a collision or roll-over.

Seat belts came into use a number of years ago to hold a driver in his seat inside the roll bar cage. In 1964, Joe Weatherly's stock car hit a retaining wall on the driver's side. The seat belt allowed the upper part of Weatherly's body to be thrown around and his head, shoulder, and left arm were forced outside the roll bar frame and through the window opening. His head hit the retaining wall and he was killed. As a result of Joe Weatherly's death, window nets were introduced to keep a driver's left arm, left shoulder and head within an area defined by the roll bar cage.

The window nets that are used today are attached to the roll bar cage adjacent to the drivers left side. The function of window nets is to retain a driver's head, left shoulder, and left arm within the area defined by the roll bar cage in the event of a roll-over or side impact. The window nets are also to keep rocks, car parts, and other foreign objects from entering the space defined by the roll bar cage.

The governing bodies which sanction stockcar racers have established minimum test procedures and specifications for race car components, including window nets. The SFI Foundation, Inc. window net specification requires window nets to prevent pass through of a solid ball that is three inches in diameter. The specification further requires that window nets prevent the penetration of a bag that is ten inches in diameter, weighs one hundred seventy five pounds, and is dropped from a height of fifteen inches above window nets that are held in a horizontal position.

Two types of window nets are commonly used. They are string window nets and ribbon nets. String window nets have a plurality of spaced horizontal strings and a plurality of spaced vertical strings. Visibility through string window nets is good. However, string window nets do not have sufficient strength to pass impact tests. String window nets generally will not prevent the penetration of a ten inch diameter bag weighing one hundred seventy five pounds that is dropped from a vertical height of fifteen inches. String window nets could also be expected to fail if a driver's body hit the net relatively hard.

Ribbon nets are made from a plurality of horizontal and vertical straps that are stitched together. The straps, which are usually one inch nylon webbing, are stitched together on three and one-fourth inch centers. This spacing produces two and one-fourth inch square apertures. The one inch wide webbing reduces side visibility substantially. Some race car drivers contend that the driver should be looking forward and that drivers do not need to look to the side. Other drivers race without ribbon nets unless the race track management requires window nets because of the side visibility problem. Drivers of off-road vehicles often need the protection of window nets and the side visibility. The width of the one inch webbing used to make ribbon nets cannot be decreased. These window nets have to be double stitched and cross stitched at each point where the webbing crosses to pass impact tests. When ribbon nets are subject to the one hundred seventy five pound, fifteen inch drop test, the ten inch diameter bag tends to exert substantially all of the force on two or three horizontal straps and on two or three vertical straps. Unless the webbing is stitched together well, the stitching can fail and allow the bag to penetrate the ribbon net. It takes time to stitch the horizontal and vertical webs to each other at each place they cross. The stitching requirements increase the cost of the window nets.

SUMMARY OF THE INVENTION

An object of the invention is to construct a vehicle window net that is strong and durable.

Another object of the invention is to provide a vehicle window net that does not unduly limit driver visibility.

A further object of the invention is to provide a vehicle window net that can display numbers and letters without reducing driver visibility.

A still further object of the invention is to provide a vehicle window net that improves vehicle aerodynamics.

The window net for racing and off-road vehicles is made from a woven mesh netting with small apertures. Heavy webbing members are folded along a centerline running the length of the webbing. The edges of the woven mesh netting are encased in and sandwiched between the folded webbing members. The folded webbing members are then double stitched to retain the woven mesh netting. The webbing members are also stitched to each other at the corners. The folded webbing members at the top and bottom of the window net form sleeves. These sleeves receive rods that mount the window net to the vehicle roll bar cage.

The foregoing and other objects, features and advantages of the present invention will become apparent in the light of the following detailed description of an exemplary embodiment thereof, as illustrated in the accompanying drawing.

BRIEF DESCRIPTION OF THE DRAWING

FIG. 5 is an elevational view of a window net with a number printed on the woven net material.

DESCRIPTION OF THE PREFERRED EMBODIMENT

Vehicles 10, for racing and off-road use, have been equipped with roll bar cages 12 which surround the driver and, in some vehicles, a driver and a passenger.

Figure 4:
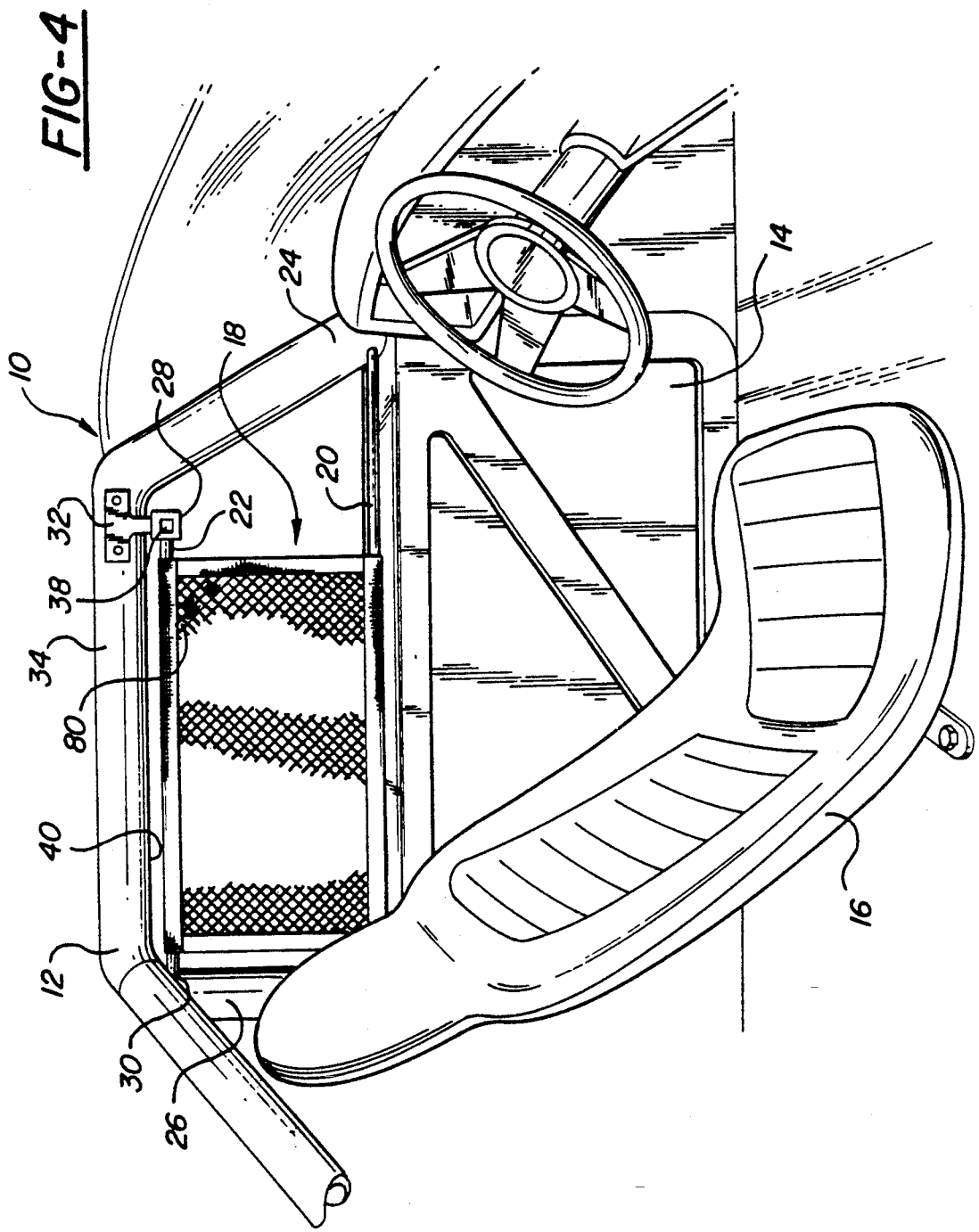
FIG. 4 is a perspective view of a window net mounted in a vehicle roll bar cage.

These roll bar cages 12, as shown in FIG. 4, are designed to retain structural integrity during collisions and roll-overs. The usual practice is to mount the roll bar cage within the vehicle body panels 14 and to allow the body panels to be bent, deformed, and even torn from the vehicle 10 while the roll bar cage maintains and protects the space the driver occupies. Roll bar cages successfully prevent drivers and passengers from being crushed. In the majority of vehicle collisions and roll-overs the drivers and passengers avoid serious injury if they stay within the area surrounded by the roll bar cage 12. Elaborate seat belt systems have been developed to hold drivers and passengers in their seats 16 and within the roll bar cage 12. These seat belts do an excellent job of retaining the torso from forward movement and up and down movement relative to the seat 16. Seat belts do not keep hands and arms from being thrown out from the torso. It has also been observed that in roll-overs and side impact collisions the upper body can be thrown to the side and out of the shoulder belts.

Figure 2:
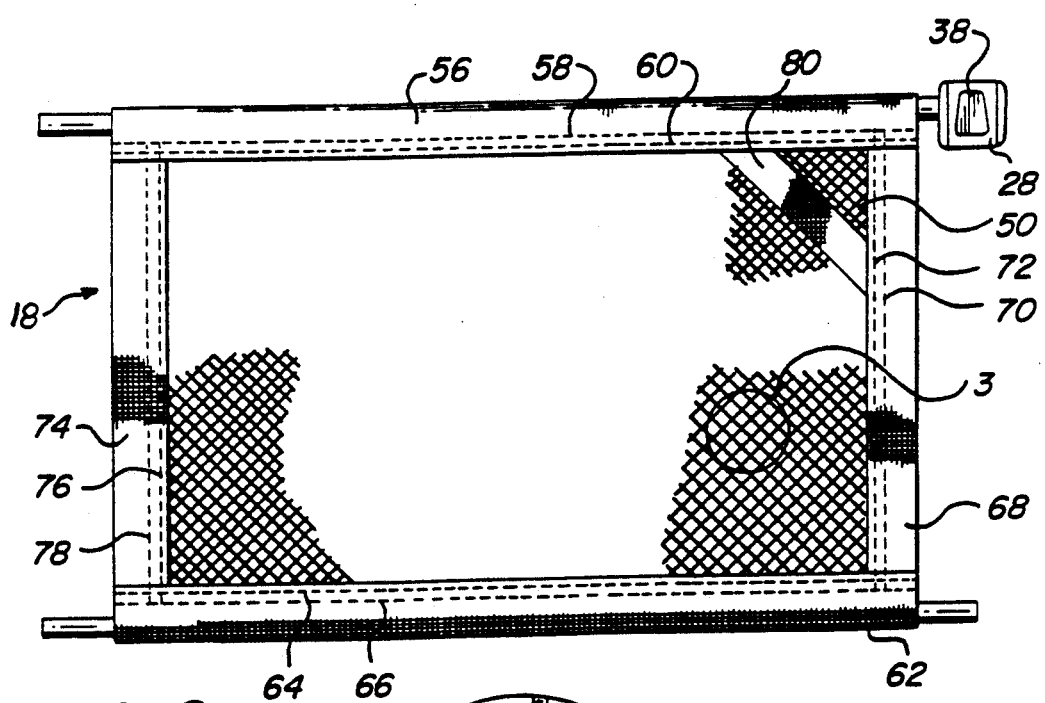
FIG. 2 is a side elevational view of the window net of the present invention, with woven net material having edges that are encased in webbing and showing mounting rods.

Window nets 18, as shown in FIGS. 2, 4 and 5 are used to keep hands, arms, shoulders and heads inside the area surrounded by the roll bar cage 12 during roll-overs and crashes with side impacts. Such window nets 18 are fastened to the roll bar cage by a lower bar 20 and an upper bar 22. The lower bar 20, as shown in FIG. 4, which depicts the present invention passes into an aperture in a forward member 24 and an aperture in the rear vertical member 26 of the roll bar cage 12. A retainer (not shown) limits fore and aft movement of the lower bar 20 to keep the lower bar fixed to the roll bar cage 12.

The upper bar 22 has a seat belt-type releasable fastener 28 attached to its forward end. The rear end of the upper bar 22 is inserted into a bore at 30 as shown in FIG. 4, in the rear vertical member 26 of the roll bar cage 12. The forward end of the upper bar 22 and the seat belt-type releasable fastener is moved vertically upward and into engagement with the male part 32 of a seat belt. The male part 32 is rigidly secured to the horizontal member 34 of the roll bar cage 12. To release the window net 18 so that the driver can enter into or exit from the vehicle 10, the button 38 is depressed to release the seat belt-type releasable fastener 28, the seat belt-type releasable fastener is moved downwardly out of engagement with the male part 32 and the upper bar 22 is moved forward out of the bore at 30. Once the upper bar 22 is released from the bore at 30 in the rear vertical member 26, the window net 18 can swing downwardly and hang from the lower bar 20, leaving the side window opening 40, unobstructed from the horizontal member 34 to the lower bar 20 and from the forward member 24 to the rear vertical member 26 of the roll bar cage 12. The window net 18 is returned to the position for protecting the driver as shown in FIG. 4 by reversing the procedure for releasing the window net described above.

Figure 1:
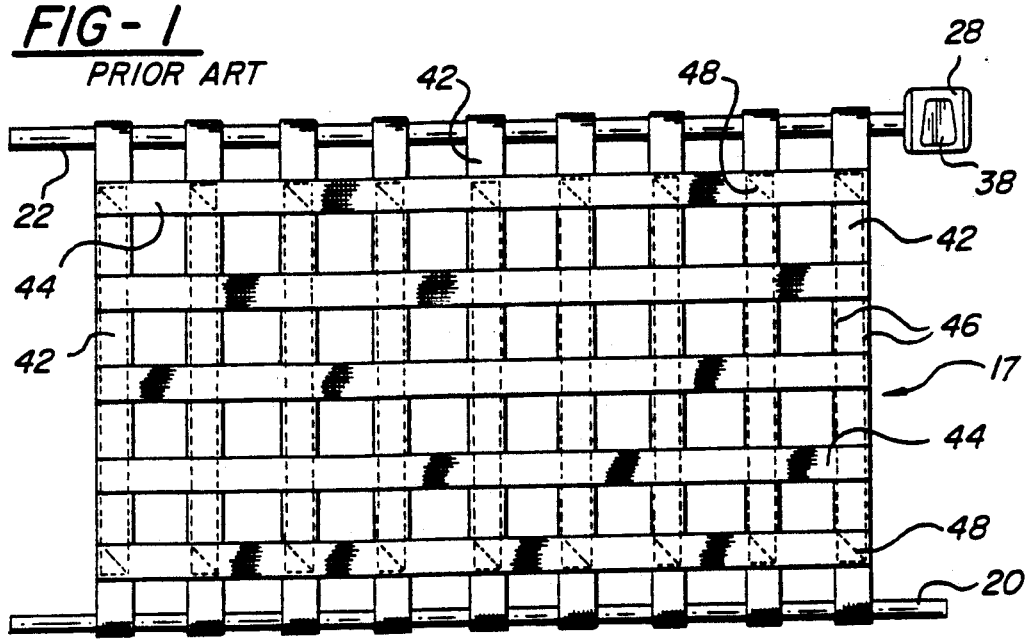
FIG. 1 is a side elevational view of a prior art ribbon-type window net and mounting rods as seen from the inside of a vehicle.

Ribbon-type window nets 17, as shown in FIG. 1, have been used for a number of years. These ribbon-type window nets 17 have several vertical ribbons made from one inch wide webbing members 42 with two and one-fourth inch spaces between adjacent webbing members. A loop is formed in each end of each vertical webbing member 42. The lower bar 20 passes through each of the lower loops and the upper bar 22 passes through each of the upper loops on each vertical webbing member 42. Ribbon-type window nets 17 also have several horizontal ribbons made from one inch wide webbing members 44 with two and one-fourth inch spaces between adjacent webbing members. The horizontal webbing members 44 are attached to each of the vertical webbing members 42 by at least two rows of stitches 46. Cross stitches 48 are added to further secure at least the top and bottom horizontal webbing members 44 to each of the vertical webbing members 42 in the better quality ribbon-type window nets 17.

Ribbon-type window nets 17 save lives and prevent serious injuries by keeping the left hand, left arm, left shoulder and the head of drivers within the area surrounded by the roll bar cage 12. Ribbon-type window nets 17 have been such a success that many race tracks and race associations require their use. There are numerous former race car drivers with mangled left arms and hands who could have avoided injury by using window nets.

Ribbon-type window nets 17 have however been found to have some serious drawbacks and problems as previously rated. The one inch wide webbing members 42 and 44 reduce side visibility substantially. This is particularly true of the horizontal webbing members 44 which the driver can only see around by raising or lowering his head. Another problem encountered by ribbon-type window nets 18 is their failure to share the load between webbing members 42 and 44. When a ribbon-type window net 18 is struck by a driver's head and helmet, a loose vehicle part, or a one hundred seventy five pound test bag as described above, two or three of the horizontal webbing members 44 and two or three of the vertical webbing members 42 take substantially all of the force. The remaining webbing members 42 and 44 generally absorb only a small part of the force. This overloading of a small number of webbing members 42 and 44 can overload the stitching and destroy a ribbon-type window net 17.

Figure 3:
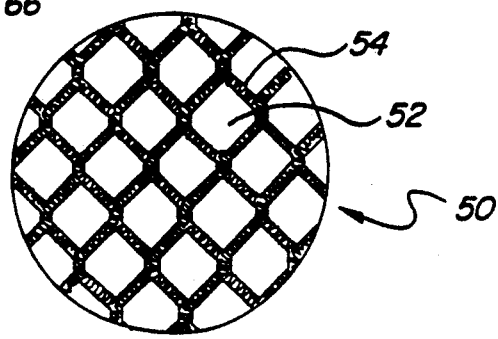
FIG. 3 is an enlarged view of the woven mesh net material at area 3 in FIG. 2.

The window net 18 of the present invention, shown in FIGS. 2, 4, and 5, has a woven mesh 50. This mesh is made of 100 percent polyester, multiple thread, cords that are woven into a mesh by Jason Mills, Inc. The specific woven mesh 50 manufactured by Jason Mills is identified as style number 8600 made from 1000 denier tire cord. The woven mesh 50 has a Muller ball burst strength of 190 pounds per square inch. The knit is 24 gauge with 12 needles per inch. The weave design is a one-fourth inch aperture with a delta pattern. The woven mesh 50 has small apertures 52 surrounded by woven multiple thread cords that form a latticed interwoven structure 54. The woven mesh 50 with apertures 52 that are about one-fourth of an inch across has been found to work very well. Each aperture 52 has six sides that are interwoven wit latticed interwoven structure 54 that form adjacent apertures. Two of the six sides, as shown in FIG. 3, are relatively short. The other four sides of each aperture 52 are about equal in length. The multiple thread cords that are woven to form the latticed interwoven structure 54 of one of the apertures 52 are slightly offset from the directly attached multiple thread cords that form the latticed interwoven structure for adjacent apertures. The weave of the woven mesh, as shown in FIG. 3, does not provide strands that pass across the window area in a continuous straight line. There is at least a small offset between apertures. The offset insures that any load on the net distorts the shape of the apertures 52 and that the force is shared throughout the entire woven mesh 50. The small apertures provide good visibility and also keep the wind out thereby improving aerodynamics. The improved aerodynamics increases speed significantly. The top edge of the woven mesh 50 is positioned between the folded over portions of a three inch wide webbing member 56 and secured by stitches 58 and 60. The folded webbing member 56 also forms a sleeve for the upper bar 22 used to attach the window net 18 to a roll bar cage 12. The bottom edge of the woven mesh 50 is positioned between the folded over portions of a three inch wide webbing member 62 and secured by stitches 64 and 66. The folded webbing member 56 also forms a sleeve for the lower bar 20 used to attach the window net 18 to a roll bar cage 12. The forward edge of the woven mesh 50 is positioned between the folded over portions of a three inch wide webbing member 68 and secured by stitches 70 and 72. The rear edge of the woven mesh 50 is positioned between the folded over portions of a three inch wide webbing member 74 and secured by stitches 76 and 78. The webbing members 68 and 74 are secured to the woven mesh 50 before webbing members 56 and 62. The ends of the webbing members 68 and 74 as well as edges of the woven mesh 50 are sandwiched between the folded over webbing members 56 and 62. Ends of the webbing members 68 and 74 are secured to the ends of the webbing member 56 by stitches 58 and 60. Ends of webbing members 68 and 74 are secured to the ends of webbing member 62 by stitches 64 and 66. The woven mesh 50 is, accordingly, attached to and completely surrounded by webbing members 56, 68, 62, and 74. An angled strap 80, that is one inch wide, is attached to the webbing members 56 and 68 in the upper front corner to strengthen the corner of the window net 18. The angled strap 80 is a corner reinforcement webbing member that also keeps the top webbing member 56 in alignment with the bottom webbing member 62 during closing of the window opening 40. Angled straps 80 could reinforce the other corners of the window net 18 if desired.

The woven mesh 50 of the window net 18 transfers force to the webbing members 56, 62, 68, and 70 around its entire periphery when it is struck by an object. By distributing the force the maximum force on a given portion of the window net 18 is reduced and the maximum force the window net can absorb without a failure is increased.

The woven mesh 50 is similar to a home window screen in that a person can see through the mesh reasonably well. A car number, as shown in FIG. 6, or a driver's name can be applied to the outer surface of the woven mesh 50 with ink, dye, paint or other suitable material. The number or letters are very visible from a distance, but do not degrade the driver's view when he looks through the woven mesh 50.

Window nets 18 are mounted directly on the roll bar cage 12. One of their functions is to retain the driver's body within the roll bar cage 12. If a window net 18 deflects or bows outwardly when the driver's body presses against the window net, a driver could contact a guard rail, the track surface, another vehicle, or some other obstruction, and be injured in a collision or rollover and be injured without a failure of the window net 18. Tests were run to determine the deflection in rectangular 18 inch by 24 inch window nets 18 of the present invention and the prior art ribbon-type window nets 17, after they stopped a one hundred seventy five pound bag, as described above, and the bag was supported by the window net for several minutes. The results of the tests showed that a ribbon-type net 17, as shown in FIG. 1, sagged or deflected one and one-half inches more than the woven mesh window net 18 shown in FIGS. 2 and 4 when subjected to the same test.

Fuel cells and other fuel system improvements have reduced the danger of fires when vehicles equipped with these improvements are involved in collisions and roll-overs. Unfortunately, fires occur in some collisions and roll-overs. When a nylon one inch wide vertical webbing member eighteen inches long is heated, it tends to contract and the tension force increases by about fifteen pounds. Such an increase in a nylon window net 17, like the window net disclosed in FIG. 1, could overload the lower bar 20 and the upper bar 22. The increased load will tend to bind the seat belt-type releasable fastener 28, thereby making it difficult for the driver to get out of the vehicle and away from the fire. To avoid the shrinkage, problem with nylon, the window net 18 of the present invention, is made from a polyester woven mesh 50 and polypropylene webbing members 56, 62, 68, and 74. Polypropylene and polyester do not shrink and do not, therefore, bind the releasable fastener 28 when heated.

Webbing tends to become stiff when subjected to a load. Placing the upper bar 22 and the lower bar 20 in the sleeves formed by the folded webbing member 56 and the folded webbing member 62 tends to stiffen the folded webbing members. The webbing members 56 and 62 are, therefore, relatively stiff and tend to hold the webbing member 68 away from the webbing member 74. Keeping the woven mesh 50 stretched out in a generally flat plane improves visibility through the woven mesh 50 and keeps the window opening 40 covered sufficiently.

The preferred embodiment of the invention has been described in detail, but is an example only and the invention is not restricted thereto. It will be easily understood by those skilled in the art that modifications and variations can easily be made within the scope of this invention.

I claim:

1. A window net adapted for racing and off-road vehicles including a woven mesh, with multiple apertures configured for load dispersion, said mesh having a forward edge, a rear edge, an upper edge and a lower edge; a front webbing member stitched to the forward edge of the woven mesh; a rear webbing member stitched to the rear edge of the woven mesh; a top webbing member folded over to form an upper bight with upper and lower portions and wherein the lower portions of the upper bight receive the upper edge of the woven mesh; stitching passing through the lower portions of the top webbing member and the upper edge of the woven mesh and through the top webbing member and the front webbing member and the rear webbing member to secure the top webbing member to the upper edge of the woven mesh, to the front webbing member and to the rear webbing member and with the upper portion of said upper bight spaced from the upper edge of the woven mesh to form an upper sleeve adapted to receive a window net mounting bar; a bottom webbing member folded over to form a lower bight with upper and lower portions and wherein the upper portions of the lower bight receive the lower edge of the woven mesh; and stitching passing through the upper portions of the bottom webbing member and the lower edge of the woven mesh and through the bottom webbing member and the front webbing member and the rear webbing member to secure the bottom webbing member to the lower edge of the woven mesh, to the front webbing member and to the rear webbing member and with the lower portion of said lower bight spaced from the lower edge of said woven mesh to form a lower sleeve adapted to receive a window net mounting bar.

2. A window net adapted for racing and off-road vehicles as set forth in claim 1 wherein the front webbing member is folded over the forward edge of the woven mesh and the rear webbing member is folded over the rear edge of the woven mesh.

3. A window net adapted for racing and off-road vehicles as set forth in claim 2 wherein the forward edge of the woven mesh is sandwiched between folded portions of the front webbing member and secured by a double row of said stitching; the rear edge of the woven mesh is sandwiched between folded portions of the rear webbing member and secured by a double row of said stitching; the upper edge of the woven mesh is secured between folded portions of the top webbing member by double stitching; and the lower edge of the woven mesh is secured between folded portions of the bottom webbing member by a double row of said stitching.

4. A window net adapted for racing and off-road vehicles as set forth in claim 2 wherein the front webbing member, the rear webbing member, the top webbing member, and the bottom webbing member are formed of polypropylene.

5. A window net adapted for racing and off-road vehicles as set forth in claim 2 including a corner reinforcement webbing member that is stitched to the front webbing member and to the top webbing member and extends across one corner of the woven mesh.

6. A window net adapted for racing and off-road vehicles as set forth in claim 1 including indicia on the woven mesh which does not interfere with visibility through the woven mesh.

7. A window net, adapted for use on racing and off-road vehicles including a vehicle body, a roll bar cage, an upper window net mounting bar and a lower window net mounting bar attached to the roll bar cage, said window net comprising a woven mesh with a forward edge, a rear edge, an upper edge, a lower edge and multiple apertures configures for load dispersion, and that allow a person to see through the woven mesh; a front webbing member that is folded over the forward edge of the woven mesh and stitched to the forward edge of the woven mesh; a rear webbing member that is folded over the rear edge of the woven mesh and stitched to the rear edge of the woven mesh; a top webbing member folded over to form an upper bight with upper and lower portions and wherein the lower portion of the upper bight receives the upper edge of the woven mesh; stitching passing through the lower portions of the top webbing member and the upper edge of the woven mesh and through the top webbing member and the front webbing member and the rear webbing member to secure the top webbing member to the upper edge of the woven mesh to the front webbing member and to the rear webbing member and with the upper portion of said upper bight spaced from the upper edge of the woven mesh to form an upper sleeve adapted to receive said upper window net mounting bar; a bottom webbing member folded over to form a lower bight with upper and lower portions and wherein the upper portions of the lower bight receive the lower edge of the woven mesh; and stitching passing through the upper portions of the bottom webbing member and the lower edge of the woven mesh and through the bottom webbing member and the front webbing member and the rear webbing member to secure the bottom webbing member to the lower edge of the woven mesh, to the front webbing member and to the rear webbing member and with the lower portion of said lower bight spaced from the lower edge of said woven mesh to form a lower sleeve adapted to receive the lower window net mounting bar.

8. A window net adapted for use on racing and off-road vehicles as set forth in claim 7 wherein the front webbing member, the rear webbing member, the top webbing member and the bottom webbing member are formed of polypropylene.

9. A window net adapted for use on racing and off-road vehicles as set forth in claim 7 including a corner reinforcement webbing member that is stitched to the front webbing member and to the top webbing member and extends across one corner of the woven mesh.

10. A window net adapted for use on racing and off-road vehicles as set forth in claim 7 including indicia on the woven mesh which does not interfere with visibility through the woven mesh.

11. A window net adapted for use on racing and off-road vehicles as set forth in claim 7 wherein the woven mesh improves vehicle aerodynamics.

12. A method of manufacturing a window net for racing and off-road vehicles with a top edge, a bottom edge, a front edge, and a rear edge, including cutting a woven mesh material to the desired height and length;
   cutting a front webbing member to a length that is substantially the same as the height of the front edge of the woven mesh material;
   folding the front webbing member along its length and placing the front edge of the woven mesh material between the folded portions of the front webbing member;
   stitching the front webbing member to the front edge of the woven mesh material;
   cutting a rear webbing member to a length that is substantially the same as the height of the rear edge of the woven mesh material;
   folding the rear webbing member along its length and placing the rear edge of the woven mesh material between the folded portions of the rear webbing member;
   stitching the rear webbing member to the rear edge of the woven mesh material;
   cutting a top webbing member to a length that is substantially the same as the length of the top edge of the woven mesh material with the front webbing member and the rear webbing member attached;
   folding the top webbing member along its length and placing the top edge of the woven mesh material, an end of the front webbing member and an end of the rear webbing member between the folded portions of the top webbing member;
   stitching the top webbing member to the top edge of the woven mesh material, to an end of the front webbing member and an end of the rear webbing member and forming a sleeve for a mounting bar that extends the length of the top edge of the window net;
   cutting a bottom webbing member to a length that is substantially the same as the length of the bottom edge of the woven mesh material with the front webbing member and the rear webbing member attached;
   folding the bottom webbing member along its length and placing the bottom edge of the woven mesh material, an end of the front webbing member and an end of the rear webbing member between the folded portions of the bottom webbing member; and stitching the bottom webbing member to the bottom edge of the woven mesh material, to an end of the front webbing member and an end of the rear webbing member and forming a sleeve for a mounting bar that extends the length of the bottom edge of the window net.

13. A method of manufacturing a window net for racing and off-road vehicles as set forth in claim 12 including attaching an angled webbing member to one of the webbing members that forms a sleeve and to one of the webbing members that does not form a sleeve to strengthen the adjacent corner.

14. A method of manufacturing a window net for racing and off-road vehicles as set forth in claim 12 wherein the woven mesh includes a number of apertures surrounded by woven webs that change shape when the window net is subjected to a force and transfer the force throughout the window net.

15. A method of manufacturing a window net for racing and off-road vehicles as set forth in claim 14 wherein the apertures in the woven mesh are about one-fourth inch across.

16. A method of manufacturing a window net for racing and off-road vehicles as set forth in claim 12 wherein the woven mesh transfers force against the woven mesh to the entire circumference of the window net.

17. A window net adapted for racing and off-road vehicles as set forth in claim 2 wherein the woven mesh is woven polyester cords.

18. A window net adapted for use on racing and off-road vehicles as set forth in claim 8 wherein the woven mesh is woven polyester cords.

19. A window net adapted for racing and off-road vehicles including a woven mesh, with multiple apertures, configured for load dispersion, said mesh having a forward edge, a rear edge, an upper edge and a lower edge; a front webbing member stitched to the forward edge of the woven mesh; a rear webbing member stitched to the rear edge of the woven mesh; a top webbing member having a lower portion receiving the upper edge of the woven mesh and an upper loop portion adapted to receive a window net upper mount bar, a bottom webbing member having an upper portion receiving the lower edge of the woven mesh and a lower loop portion adapted to receive a window net lower mount bar, said top and bottom webbing members both extending to lie in lapped relationship with said front and rear webbing members to form a closed perimetral border for said mesh, and stitching extending through said webbing members and woven mesh edges around said border, through said top webbing member and front and rear webbing members, and through said bottom webbing member and front and rear webbing members.

20. A window net adapted for use on racing and off-road vehicles including a woven mesh material cut to conform to the size and shape of a portion of a window that is to be covered; a plurality of webbing members that are folded over the edges of the woven mesh, stitched to the woven mesh, and stitched to each other to completely encase the edges of the woven mesh and to completely perimetrally surround the woven mesh; and wherein the woven mesh comprises multiple thread cords that are interwoven to form multiple adjacent hexagonal apertures.

21. A window net adapted for use on racing and off-road vehicles, as set forth in claim 20, wherein two adjacent hexagonal apertures in said woven mesh have a common side formed by an interwoven member and each end of the interwoven member that forms said common side is connected to two interwoven members that form another side of one of said two adjacent hexagonal apertures.

22. A window net adapted for use on racing and off-road vehicles, as set forth in claim 20, wherein two of the sides of each hexagonal aperture in said woven mesh are shorter than the other sides.

* * * * *